May 25, 1926. 1,585,839
G. ERNST
LAND ROLLER AND STALK CUTTER
Filed Feb. 23, 1924 2 Sheets-Sheet 1

Inventor
Gottlieb Ernst
By
Attorney

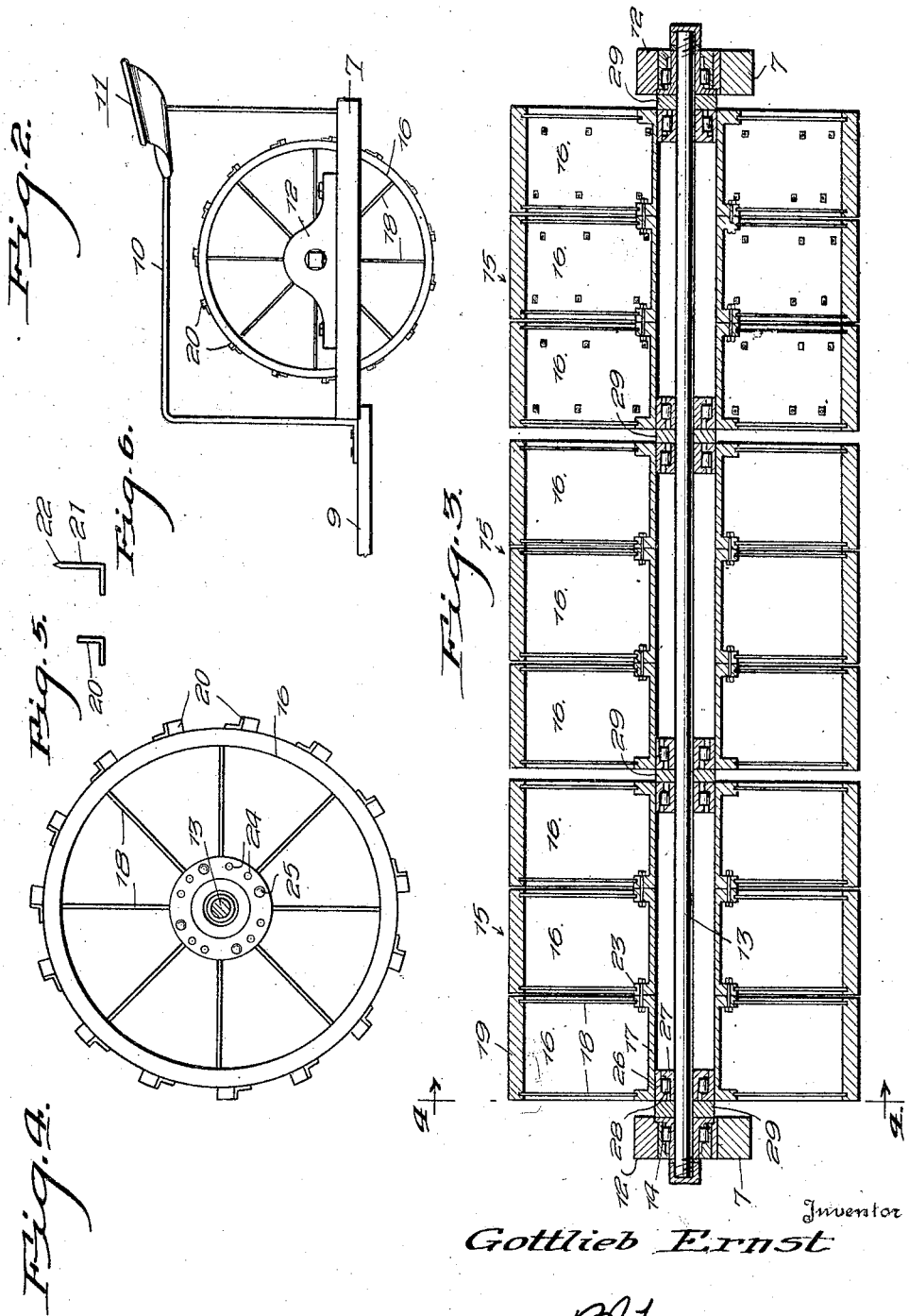

Patented May 25, 1926.

1,585,839

UNITED STATES PATENT OFFICE.

GOTTLIEB ERNST, OF CORDELL, OKLAHOMA, ASSIGNOR OF ONE-HALF TO WILLIAM AACHTE, OF CORDELL, OKLAHOMA.

LAND ROLLER AND STALK CUTTER.

Application filed February 23, 1924. Serial No. 694,620.

One of the principal objects of the present invention is to provide a roller that may be used for crushing clods, cutting stalks and the like, and which is constructed so as to be light in draft, is easily turned and will work in confined places. A further and important object is to provide a structure made up of interchangeable and detachable parts or sections, which greatly reduces the cost of repairs and replacements.

The preferred form of construction is illustrated in the accompanying drawings, wherein:—

Figure 2 is a side elevation,

Figure 3 is a sectional view on the line 3—3 of Figure 1,

Figure 4 is a sectional view on the line 4—4 of Figure 3,

Figures 5 and 6 are respectively detail views showing clod-crushing and stalk cutting blades.

Figure 1:
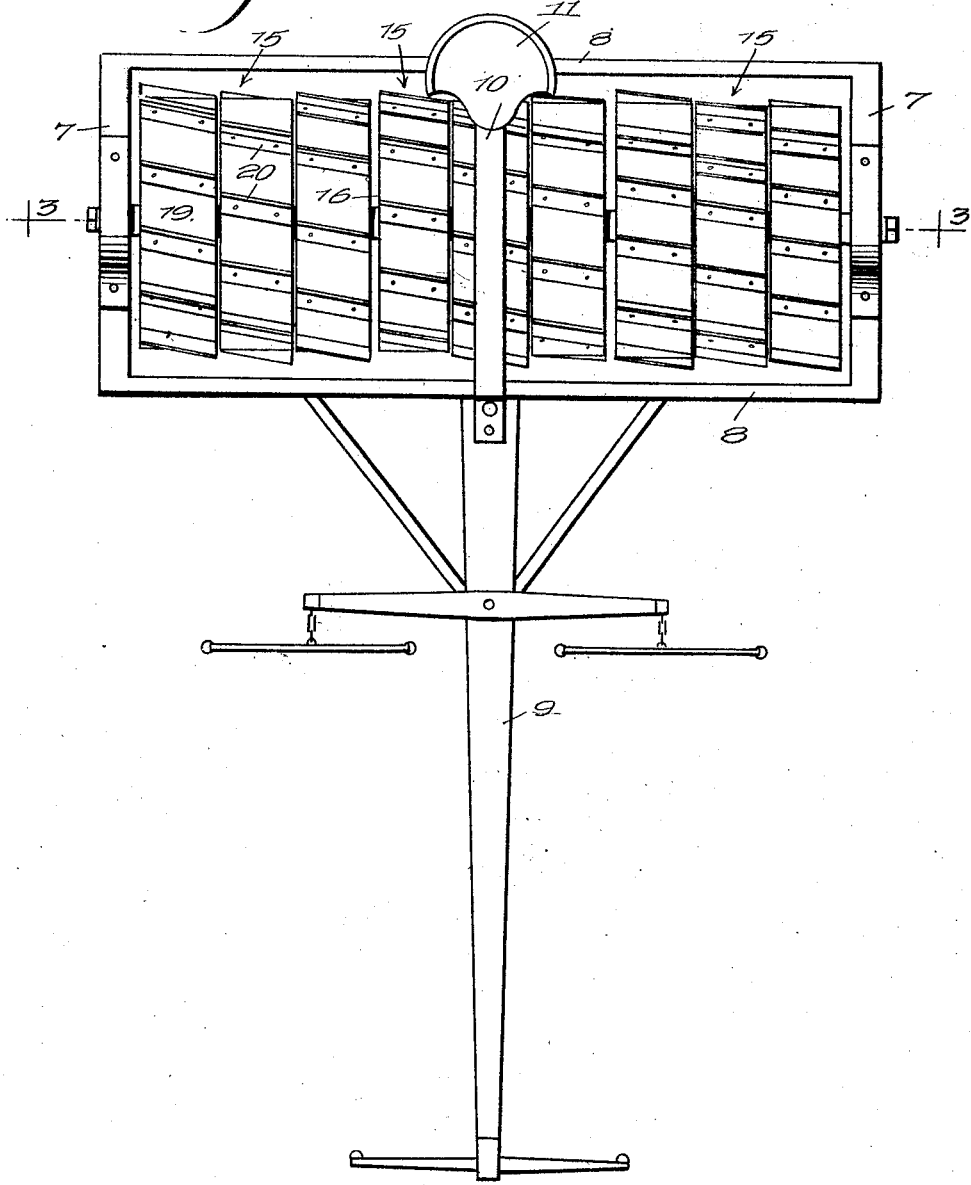
Figure 1 is a plan view of the inplement.

A carrier frame is employed, preferably rectangular in form and comprising end bars 7 connected by cross bars 8. From this frame extends the usual tongue 9, on which may be mounted suitable draft devices. An arch bar 10, extending over the central portion of the carrier frame, supports a suitable seat 11.

The end bars 7 are provided on their central portions with bearing boxes 12, into which extend the ends of an axle 13, said axle having said ends provided with roller bearings 14 in the boxes 12. Mounted on the axle 13 are a plurality of roller members, three being shown and designated 15. These members are duplicates, one of the other, and each in turn is made up of roller sections 16. The sections 16, in turn, are duplicates. Each section consists of a hub 17 with radial spokes 18, on which is mounted a rim or peripheral wall 19. The peripheral wall has detachably secured to it an annular series of diagonally disposed blades. These blades may be either relatively short and blunt, as shown at 20, constituting clod crushers, or they may be longer, as indicated at 21 in Figure 6, with their edges 22 sharpened, forming stalk cutters. The blades are obviously readily interchangeable. Each of the hubs 17 is provided with terminal flanges 23 and the said flanges are provided with sets of bolt receiving openings 24. The sections 16 are adapted to be fixedly secured together by bolts 25 and by having a series of bolt holes 24, the relation of the sections 16 can be arranged, so that the cutting blades 20 or 21 are arranged in spiral relation as clearly illustrated in Figure 1. It will thus be seen that each member 15 is made up of triple relatively fixed but detachable sections. The outer ends of the hubs, forming the outer sections 16 of each member 15, are provided with bushings 26, forming roller-races and on the axle 13 are placed other roller-races 27, rollers 28 being located in the races and thus forming roller-bearings for each member 15. Preferably also spacing washers 29 are interposed between the members and between the outer ends of the outer members and the boxes 12 or ball bearings 14.

This implement, it will be obvious, has a very light draft, not only because of the ball bearings of each member, but by reason of the fact that the axle itself can also turn, so that when the members are moving at different rates of speed, as for example, in turning corners and the like, all the parts can relatively rotate. By having a plurality of members, each member can rotate independently, and this in itself assists in the lightness of draft. The members 15, being of the same construction, any one can be placed in any position, so that they are interchangeable and by having each member in turn made up of sections, these sections can be readily assembled in any relation desired and relatively fixed so that the blades are in spiral relation.

From the foregoing, it is thought that the construction, operation and many advantages of the herein described invention will be apparent to those skilled in the art, without further description, and it will be understood that various changes in the size, shape, proportion and minor details of construction, may be resorted to withont departing from the spirit or sacrificing any of the advantages of the invention.

What I claim, is:—

An agricultural implement of the character set forth, comprising a carrier frame, an axle thereon, and a roller member comprising substantially duplicated roller sections located end to end and journaled on the axle, said roller sections each having a peripheral series of blades, said sections furthermore having a plurality of sets of bolt holes that are disposed apart a distance less than a quarter of a circle, the holes of the different sections being movable into alinement when the blades of said sections are in different relations, and bolts that pass through the bolt holes to hold the roller sections in different relatively fixed relations while permitting the roller as a whole to rotate.

In testimony whereof, I affix my signature.

GOTTLIEB ERNST.